United States Patent
Lents et al.

(10) Patent No.: US 10,224,556 B2
(45) Date of Patent: Mar. 5, 2019

(54) INTEGRATED FUEL CELL AIRCRAFT PRESSURIZATION AND COOLING SYSTEM

(71) Applicant: Hamilton Sundstrand Corporation, Windsor Locks, CT (US)

(72) Inventors: Charles E. Lents, Amston, CT (US); Jonathan Rheaume, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 507 days.

(21) Appl. No.: 14/969,184

(22) Filed: Dec. 15, 2015

(65) Prior Publication Data

US 2017/0170494 A1    Jun. 15, 2017

(51) Int. Cl.
*H01M 8/04111*   (2016.01)
*B64D 13/06*   (2006.01)
(Continued)

(52) U.S. Cl.
CPC ......... *H01M 8/04111* (2013.01); *B64D 13/02* (2013.01); *B64D 13/06* (2013.01);
(Continued)

(58) Field of Classification Search
CPC ......... H01M 8/04111; H01M 8/04097; H01M 8/04201; H01M 2250/20; H01M 2250/407; F04D 29/284; F04D 25/06; F04D 25/045; B64D 13/02; B64D 15/04; B64D 37/32; B64D 13/06; B64D 2013/0644;
(Continued)

(56) References Cited

U.S. PATENT DOCUMENTS

| 5,701,755 A | 12/1997 | Severson et al. |
| 6,450,447 B1 | 9/2002 | Konrad et al. |

(Continued)

FOREIGN PATENT DOCUMENTS

| EP | 2927130 A1 | 10/2015 |
| WO | WO02056401 A2 | 7/2002 |

(Continued)

OTHER PUBLICATIONS

Extended European Search Report for EP Application No. 16202222.2, dated May 11, 2017, 11 Pages.

*Primary Examiner* — Gary D Harris
(74) *Attorney, Agent, or Firm* — Kinney & Lange, P.A.

(57) ABSTRACT

According to one embodiment of this disclosure an integrated fuel cell and environmental control system includes a turbo-compressor. The turbo-compressor includes a rotatable shaft, a compressor rotatable with the shaft to generate a flow of compressed air, a motor connected to the shaft, and a turbine connected to the shaft. The system further includes a fuel cell connected to the compressor by a first compressed air supply line that supplies a first portion of the flow of compressed air to the fuel cell. The fuel cell is connected to the turbine by a fuel cell exhaust line that supplies a flow of fuel cell exhaust to the turbine and causes the turbine to rotate. The system further includes an environmental control system connected to the compressor by a second compressed air supply line that supplies a second portion of the flow of compressed air to the environmental control system.

20 Claims, 5 Drawing Sheets

(51) Int. Cl.
  *B64D 15/04*    (2006.01)
  *B64D 37/32*    (2006.01)
  *F04D 25/04*    (2006.01)
  *F04D 25/06*    (2006.01)
  *F04D 29/28*    (2006.01)
  *H01M 8/04082*  (2016.01)
  *B64D 13/02*    (2006.01)
  *H01M 8/04089*  (2016.01)
  *B64D 41/00*    (2006.01)

(52) U.S. Cl.
  CPC ............ *B64D 15/04* (2013.01); *B64D 37/32* (2013.01); *F04D 25/045* (2013.01); *F04D 25/06* (2013.01); *F04D 29/284* (2013.01); *H01M 8/04097* (2013.01); *H01M 8/04201* (2013.01); *B64D 2013/0607* (2013.01); *B64D 2013/0618* (2013.01); *B64D 2013/0644* (2013.01); *B64D 2013/0648* (2013.01); *B64D 2013/0651* (2013.01); *B64D 2041/005* (2013.01); *H01M 2250/20* (2013.01); *H01M 2250/407* (2013.01)

(58) Field of Classification Search
  CPC .... B64D 2013/0607; B64D 2013/0618; B64D 2041/005; B64D 2013/0648; B64D 2013/0651
  USPC ........................................................ 429/408
  See application file for complete search history.

(56)  References Cited

U.S. PATENT DOCUMENTS

| | | | |
|---|---|---|---|
| 6,607,854 B1* | 8/2003 | Rehg ................. | H01M 8/04089 429/413 |
| 6,641,084 B1 | 11/2003 | Huber et al. | |
| 9,003,814 B2 | 4/2015 | Zywiak et al. | |
| 2003/0049505 A1* | 3/2003 | Kameya ............ | H01M 8/04089 429/415 |
| 2007/0122667 A1* | 5/2007 | Kelley ................... | C01B 3/382 429/411 |

FOREIGN PATENT DOCUMENTS

| | | |
|---|---|---|
| WO | WO2004040680 A2 | 5/2004 |
| WO | WO2008014912 A1 | 2/2008 |

* cited by examiner

INTEGRATED FUEL CELL AIRCRAFT PRESSURIZATION AND COOLING SYSTEM

BACKGROUND

Fuel cell power systems are well known for converting chemical energy into usable electrical power, and have applications ranging from stationary power plants to automotive vehicles. Fuel cell power systems typically include an electrolyte, which can be a liquid (e.g., phosphoric acid), a membrane (e.g., a proton exchange membrane) or a solid (e.g., a ceramic oxygen ion conductor), that is located between an anode electrode and a cathode electrode to form a cell assembly. The electrodes commonly contain a catalyst to promote the desired reactions. During operation, reactants are continuously supplied to the electrodes.

A fuel cell power system's power output and efficiency are tied to an inlet pressure of air that is supplied to the fuel cell power system and that is used in conjunction with the fuel to produce electricity. Therefore, if a fuel cell power system is used to power electrical systems in an airplane, the fuel cell power system will have to be supplied with a source of compressed air.

However, providing a fuel cell power system with its own dedicated source of compressed air such as from a motor driven compressor is inefficient. This is because the motor driven compressor can be heavy and it is difficult to justify the added weight of the motor driven compressor solely for the purpose of supplying compressed air to the fuel cell power system.

Because fuel cell power systems offer the potential to produce electrical power in an aircraft, there is a need to increase the efficiency of the fuel cell power system by integrating the fuel cell system with other systems that use compressed air in order to justify the added weight of a motor-driven compressor.

SUMMARY

According to one embodiment of this disclosure an integrated fuel cell and environmental control system includes a turbo-compressor. The turbo-compressor includes a rotatable shaft, a compressor rotatable with the shaft to generate a flow of compressed air, a motor connected to the shaft, and a turbine connected to the shaft. The system further includes a fuel cell connected to the compressor by a first compressed air supply line that supplies a first portion of the flow of compressed air to the fuel cell. The fuel cell is connected to the turbine by a fuel cell exhaust line that supplies a flow of fuel cell exhaust to the turbine and causes the turbine to rotate. The system further includes an environmental control system connected to the compressor by a second compressed air supply line that supplies a second portion of the flow of compressed air to the environmental control system.

According to yet another embodiment of this disclosure a method for powering a system includes the step of supplying a compressor with a flow of air. The method further includes the step of producing a flow of compressed air in the compressor. The method further includes the step of supplying a first portion of the flow of compressed air to a fuel cell. The method still further includes the step of supplying a second portion of the flow of compressed air to an environmental control system. Electrical power is supplied by the fuel cell, and a flow of exhaust gas is supplied from the fuel cell to a turbine connected to the compressor by a shaft.

DETAILED DESCRIPTION

Figure 1A:
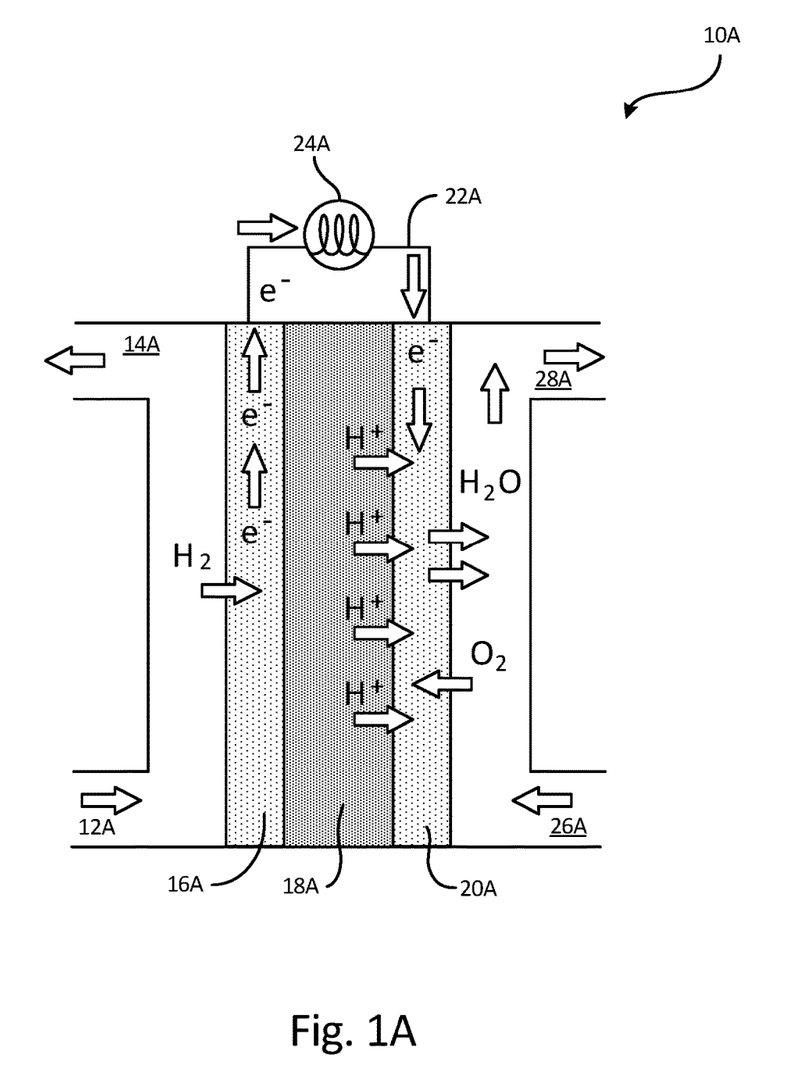
FIG. 1A is a schematic view of a proton exchange fuel cell.
Figure 1B:
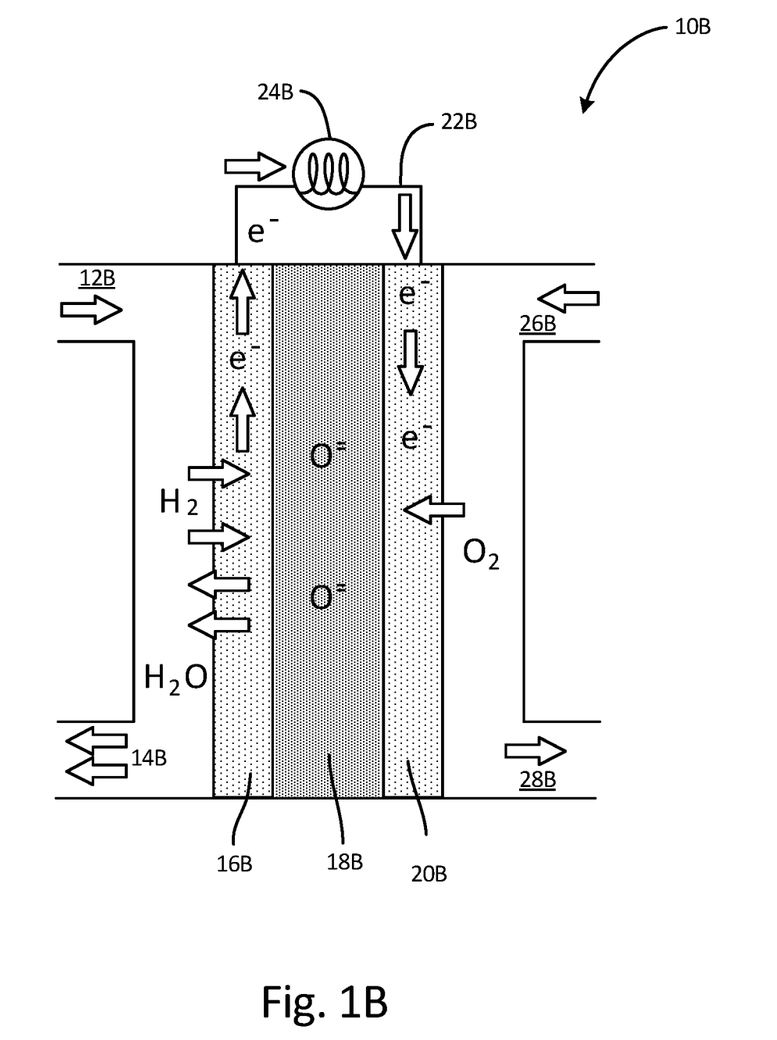
FIG. 1B is a schematic view of a solid oxide fuel cell.

In this application an integrated aircraft fuel cell power system and air pressurization and cooling system is disclosed. FIGS. 1A and 1B show two types of fuel cells that can be integrated into the system.

FIG. 1A is a schematic view of proton exchange membrane fuel cell 10A, which can also be referred to as a polymer electrolyte fuel cell. FIG. 1A includes fuel inlet 12A, fuel outlet 14A, anode electrode 16A, electrolyte 18A, cathode electrode 20A, wire 22A, electric load 24A, air inlet 26A, and exhaust outlet 28A. Fuel inlet 12A and fuel outlet 14A are disposed in fuel cell 10A in connection to anode electrode 16A. Electrolyte 18A is includes a membrane and is located between anode electrode 16A and cathode electrode 20A. Wire 22A bridges anode 16A and cathode 20A and includes resistor 24A. Air inlet 26A and exhaust outlet 28A are located proximate to cathode 20A.

In operation, fuel such as hydrogen, methanol, or reformate including reformed hydrocarbons such as methane, methanol, ethanol, naphtha, gasoline, kerosene, and diesel that has been scrubbed of carbon monoxide is delivered through fuel inlet 12A to anode 16A. At anode electrode 16A, the hydrogen fuel is catalytically split into protons and electrons. A typical catalyst can be a platinum-based catalyst. Any excess fuel is routed through fuel outlet 14A to a hydrogen fuel tank (not shown) where it can be recirculated. Protons created at anode 16A permeate through electrolyte 18A to cathode 20A. Electrons travel through wire 22A and electric load 24A to cathode 20A. The traveling electrons create an electrical current. The current can be used to power a load configured to draw power from fuel cell 10A. At cathode electrode 20A, oxygen molecules in air, which are supplied through air inlet 26A, react with protons through a reduction reaction. The reaction of oxygen molecules and protons produces water molecules. Water molecules exit fuel cell 10A through exhaust outlet 28A. Fuel cell 10A typically operates at higher temperatures but below the boiling point of water, thus liquid water exits fuel cell 10A as well as water vapor in the outgoing flow streams. In addition to water leaving fuel cell 10A, humid hot air also leaves fuel cell via exhaust outlet 28A. Electrodes typically consist of particles of platinum group metals (ruthenium, rhodium, palladium, osmium, iridium, and platinum) dispersed in a carbon support with a polymer electrolyte binder. The electrolyte is usually a fluorinated polymer functionalized with sulphonic acid groups such as Nafion™.

Fuel cell 10A, as depicted in FIG. 1A, can be characterized as one cell of a fuel cell power system. That is, one cell refers to one unit of a fuel cell power system configured to produce electrical power. In order to increase the electrical output of fuel cell 10A, it can be desirable to configure a fuel cell power system to include a plurality of fuel cells 10A.

Thus a fuel cell power system can include multiple fuel cells 10A, arranged in a stack each including a fuel inlet, fuel outlet, anode, electrolyte, cathode, wire, air inlet, and exhaust outlet separated by bipolar plates and capped with end plates that contain provisions to interface with an electrical load circuit. Alternatively, fuel cell 10A can have multiple anode, electrolyte, and cathode units that are in communication with one fuel inlet, fuel outlet, air inlet, and exhaust outlet. A fuel cell power system can include several stacks. In addition, a fuel cell power system can have ancillary hardware such as a water management system, a thermal management system, and a power conditioning system.

FIG. 1B is a schematic view of solid oxide fuel cell 10B. Fuel cell 10B includes fuel inlet 12B, fuel outlet 14B, anode electrode 16B, electrolyte 18B, cathode electrode 20B, wire 22B, electric load 24B, air inlet 26B, and exhaust outlet 28B. Fuel inlet 12B and fuel outlet 14B are disposed in fuel cell 10B in connection to anode 16B. Electrolyte 18B is located between anode electrode 16B and cathode electrode 20B. Wire 22B bridges anode electrode 16B and cathode electrode 20B and includes electric load 24B. Air inlet 26B and exhaust outlet 28B are located proximate to cathode 20.

In operation, fuel such as hydrogen, carbon monoxide, or reformate including of reformed hydrocarbons such as methane, methanol, ethanol, naphtha, gasoline, kerosene, and diesel is fed into fuel cell 10B through fuel inlet 12B. The fuel diffuses through anode electrode 16B towards electrolyte 18B. Anode electrode 16B is made from material that conducts electrons. One such material is cermet, which can be made from nickel mixed with a ceramic material such as yttria-stabilized zirconia. At anode electrode 16B, fuel participates in oxidation reactions with ions transported through the electrolyte. In order to maintain charge balance, electrons are fed into wire 22B and pass through electric load 24B. The traveling electrons create an electrical current. Electrolyte 18B is configured to conduct oxygen ions. Electrolyte 18B typically is made of yttria-stabilized zirconia, scandia-stabilized zirconia, or gadolinium-doped ceria. Oxygen ions are produced at cathode electrode 20B, which includes an electrically conductive material such as lanthanum strontium manganite that may be blended with an ionically conductive material such as the electrolytes named above. Oxygen ions travel through electrolyte 18B to anode electrode 16B where fuel is oxidized to produce heat and water, which exit fuel cell 10B through exhaust outlet 28B. Fuel cell 10B is typically operated at temperatures ranging from about 500° C. to about 1000° C. Therefore, water leaves fuel cell 10B as steam, additionally, air leaving fuel cell 10B is at a relatively high temperature. Similar to the illustration of proton exchange fuel cell 10A in FIG. 1A, fuel cell 10B, as depicted in FIG. 1B, can be characterized as one cell of a plurality of cells in a stack of a fuel cell power system.

Figure 2:
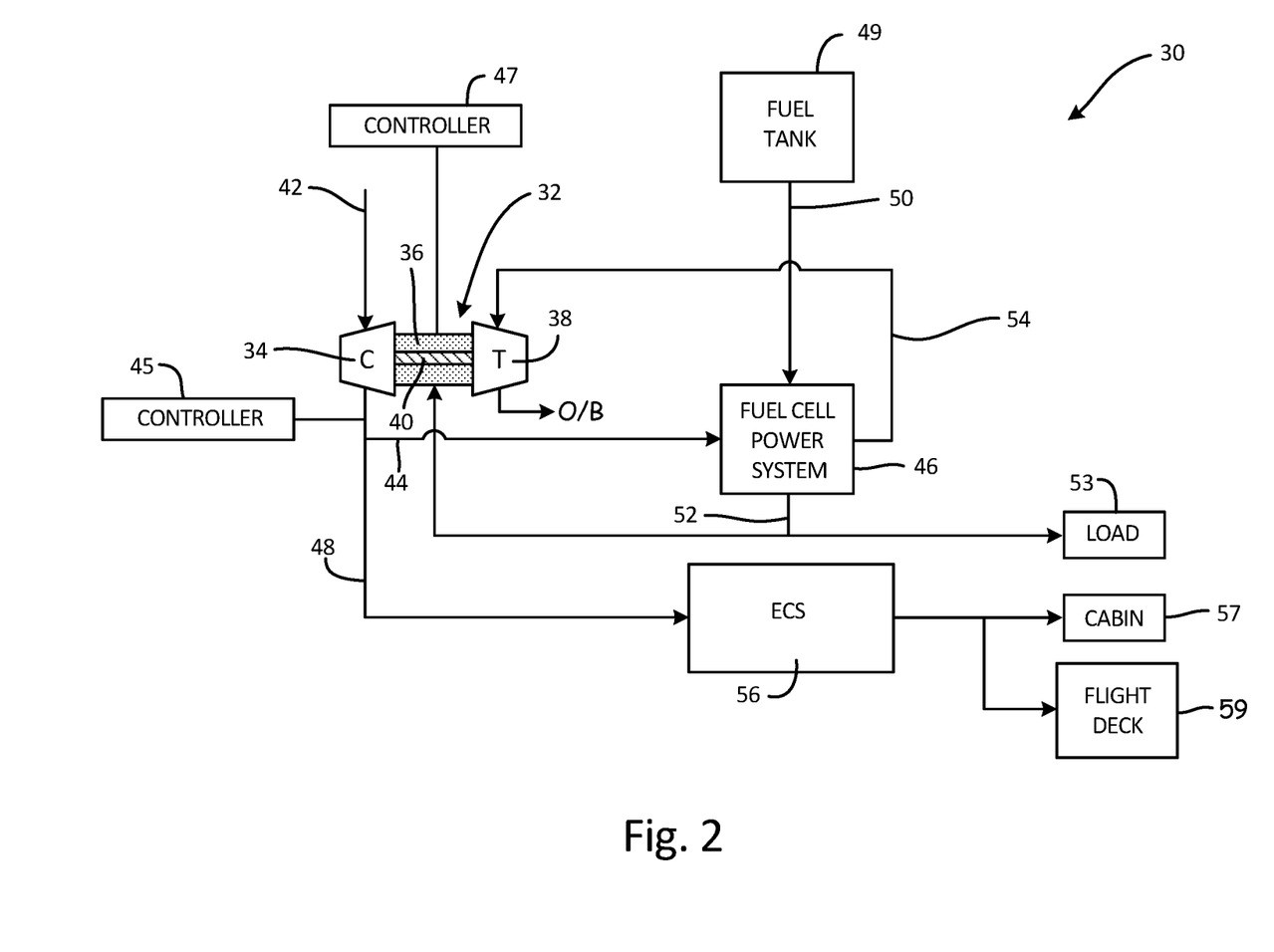
FIG. 2 is a schematic view of an integrated fuel cell power system and environmental control system including a turbo-compressor.

FIG. 2 is a schematic view of integrated fuel cell and environmental control system 30. System 30 includes turbo-compressor 32, which includes compressor 34, motor 36, turbine 38, and shaft 40. System 30 further includes air supply line 42, compressed air supply line 44, controller 45, fuel cell power system 46, controller 47, compressed air supply line 48, fuel tank 49, fuel supply line 50, cable 52, exhaust line 54, environmental control system 56, aircraft cabin 57, and flight deck 59.

In turbo-compressor 32, compressor 34, motor 36, and turbine 38 are linked to each other by shaft 40. Compressor 34 is connected to air supply line 42, which in one embodiment is used to supply ram air to compressor 34. Compressor 34 is also connected to compressed air supply line 44, which is connected to fuel cell power system 46 and transports compressed air to fuel cell power system 46. Controller 45 meters and apportions air flow from compressor 34. Compressor 34 is further connected to air supply line 48. Compressed air supply line 48 connects compressor 34 to environmental control system 56 and transports compressed air from compressor 34 to environmental control system 56, which is linked to aircraft cabin 57 and to flight deck 59. Fuel cell power system 46 receives fuel from fuel supply line 50, which is run from fuel tank 49. A motor drive (not shown) of motor 36 is connected to fuel cell power system 46 by cable 52. The motor drive is an electronic device that controls the output of the motor. Motor 36 includes controller 47. Turbine 38 is connected to fuel cell power system 46 by exhaust line 54, which transports exhaust from fuel cell power system 46 to turbine 38.

In one non-limiting embodiment, system 30, as described below, is used on an aircraft. The components of system 30 are preferably located near the junction of an aircraft wing and fuselage. In operation, compressor 34 of turbo-compressor 32 receives air from air supply line 42. Ram air can be supplied directly to compressor 34 during flight. If the aircraft is on the ground, then a fan (not shown) disposed in parallel with compressor 34 can be used to create a flow of ambient air towards fuel cell power system 46 and environmental control system 56. Compressor 34 can be one of many types of compressors. For example, compressor 34 can include multiple stages of rotating blades and stationary vanes. Compressor 34 can also be a single stage centrifugal or radial compressor. Compressor 34 is capable of compressing ram air to achieve many compression ratios. For example, compressor 34 can compress ram air at a 5:1 ratio. Compressor 34 is driven by shaft 40, which is driven by motor 36 and/or turbine 38. The operation of motor 36 and turbine 38 will be discussed further below.

Compressed air produced by compressor 34 is divided into at least two portions of compressed air. Controller 45 can be used to divide compressed air into the respective portions using one of more valves on lines 44 and 48. A first portion of compressed air flows through compressed air supply line 44 and into fuel cell power system 46. A second portion of compressed air flows through compressed air supply line 48 and into environmental control system 56. The percentage of compressed air that makes up each portion can vary depending on the needs of fuel cell power system 46 and environmental control system 56, respectively.

Fuel cell power system 46 can include fuel cells such as proton exchange membrane fuel cell 10A, described above with respect to FIG. 1A, or solid oxide fuel cell 10B, described above with respect to FIG. 1B. Compressed air enters air inlet 26A or 26B and fuel, supplied via fuel supply line 50, enters fuel inlet 12A or 12B. Fuel cell power system 46 then creates electrical power as described above with respect to fuel cells 10A and 10B. Generally, fuel cell power system 46 generates direct current. The fuel cell power system can be equipped with power conditioning equipment so that the electricity can be exported to a power bus on the aircraft. For example, electronics can be employed to condition the power to a desired voltage range and to invert the power to an alternating current waveform. The electronics that condition the power can be integrated with the fuel cell power system 46 or located elsewhere. The power bus can serve many electric loads such as motor 36.

The amount of power generated by fuel cell power system 46 is a function of the size, reactant flow rates, pressure, materials of system 46, and the electric load. That is, the power output increases as the number of cells and stacks forming fuel cell power system 46 increase. Also increasing the flow rates and pressure enable fuel cell power system 46 to respond to increasing electric loads. Fuel cell power system 46 can be used to produce a steady amount of power during flight or a variable amount of power during flight, depending on electrical demand in the aircraft.

Cable 52 transports electrical power generated in fuel cell power system 46 and is branched to connect to motor 36 in addition to other load drawing components 53. Motor 36 electronically drives shaft 40, which in turn drives compressor 34. Fuel cell power system 46 can also be configured to provide power to other electrical systems on the aircraft. For example, cable 52 can also be branched to connect to a DC bus, which can power many aircraft systems. The direct current output can also be converted to an alternating current by an inverter. If an alternating current is produced, then cable 52 can be connected to an AC bus on the aircraft to power systems requiring alternating current. Alternatively, fuel cell power system 46 can be configured to only provide power to turbo-compressor 32.

Hot exhaust gas generated in fuel cell power system 46 exits exhaust outlet 28A or 28B as described above and enters exhaust line 54. Exhaust line 54 routes exhaust to turbine 38. Turbine 38 can be one of many types of turbines. For example, turbine 38 can include multiple stages of rotating blades and stationary vanes. Turbine 38 can also be a single stage centrifugal or radial turbine. Exhaust gases are expanded through turbine 38, which drives rotation of compressor 34 by rotating shaft 40. After exhaust gas is expanded through turbine 38, the gas can be discharged overboard.

If the rotation of turbine 38 alone drives compressor 34 and generates sufficient compressed air for system 30, then motor 36 can be selectively turned off. This can be accomplished by linking motor 36 to controller 47, which receives sensor information to determine whether the compression generated by the compressor is above or below a threshold amount. That is, if the compression value is above a threshold amount, then motor 36 can be turned off, leaving turbine 38 solely responsible for driving compressor 34. Even if motor 36 is turned off, then rotation of shaft 40 by turbine 38 can cause motor 36 to generate electricity. This electricity can be converted by a power conditioner and can be used to supply power in part or in whole to other components. If the compression level falls below a threshold amount, then motor 36 can be turned on. Motor 36, however, does not have to operate at full power. That is, motor 36 can be provided with only the amount of power needed to make up the difference between the compression generated by driving compressor 34 with turbine 38 and the programed threshold value.

Motor 36 can also be solely responsible for driving compressor 34. This can be the case during start-up where motor 36 can draw electric power from a source other than fuel cell power system 46 in order to rotate compressor 34 and supply compressed air to fuel cell power system 46.

In some circumstances where turbine 38 alone is providing more power than necessary drive compressor 34, shaft 40 can be used to power other systems or components such as a pump. This can also be accomplished if turbine 38 is not providing adequate power alone by using turbine 38 and motor 36 together to provide enough power to drive compressor 34 and an additional system or component connected to shaft 40.

As stated above, a second portion of compressed air is delivered to environmental control system 56 by compressed air supply line 48. Environmental control system 56 creates pressurized conditioned air, which can be supplied to aircraft cabin 57 and flight deck 59. As two non-limiting examples, environmental control system 56 can include an air cycle system and/or a vapor cycle system.

In an air cycle system, compressed air supplied by compressed air supply line 48 is passed through a pre-cooler that absorbs excess heat from the compressed air. A flow control valve can control the amount of air flowing through the air cycle system. Downstream of the flow control valve is a cold air unit or refrigeration unit. Air cycle systems do not use Freon™ or any other refrigerant as the air supplied acts itself as a refrigerant. In the cold air unit, compressed air enters a primary heat exchanger where it is cooled by ram air. The cooled air then enters another compressor followed by a secondary heat exchanger, also cooled by ram air, where the cooled air rejects heat acquired during the compression step. The cooled air is then passed through a water extractor, expanded in a turbine to lower the temperature and to power compressors, and then supplied to an aircraft cabin and flight deck.

Typically, in a vapor cycle system, a circulating refrigerant such as Freon™ is compressed to form a vapor. The refrigerant then passes through a condenser where it condenses and rejects heat. At this stage the refrigerant is in a liquid state. The refrigerant is then passed through an expansion valve or an orifice, which reduces the pressure of the refrigerant. The refrigerant is then passed through an evaporator. Compressed air, which in this case would be supplied by compressed air supply line 48 is passed over the evaporator. The compressed air is at a temperature sufficient to evaporate the refrigerant. As the refrigerant evaporates, the temperature of the compressed air is reduced. The compressed air is then supplied to aircraft cabin 57 and flight deck 59. If environmental control system 56 is a vapor cycle system, then it will require electrical or shaft power. In that case, cable 52 can also branch to environmental control system 56, or the vapor cycle system compressor can be mechanically driven by a rotating shaft.

Figure 3:
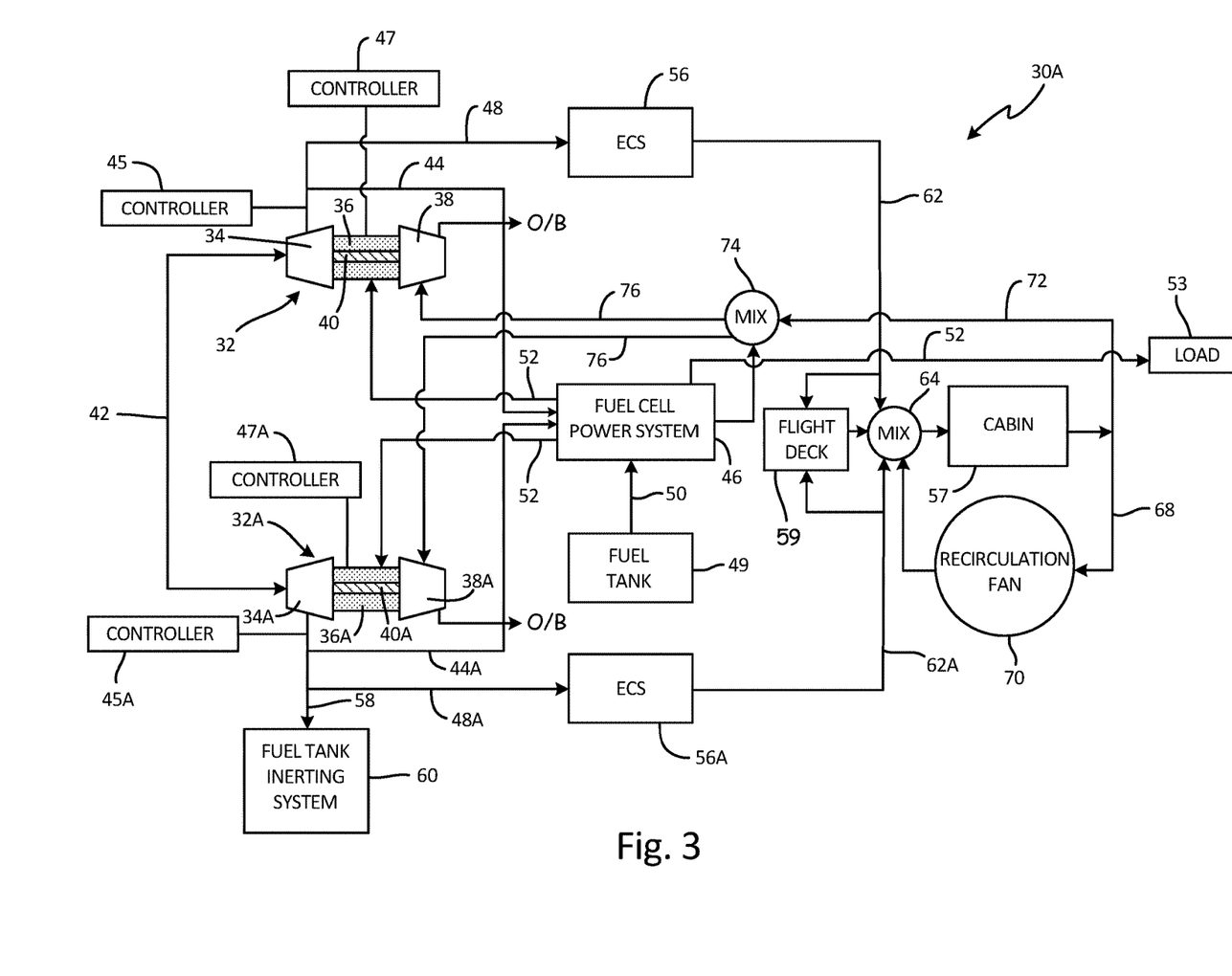
FIG. 3 is a schematic view of an integrated fuel cell power system and environmental control system including a first turbo-compressor and a second turbo-compressor.

FIG. 3 shows an alternative embodiment of an integrated fuel cell and environmental control system. The embodiment of system 30A shown in FIG. 3 shares many of the same components shown in FIG. 2 and therefore reference to components denoted by the same reference numbers will be included in the description of FIG. 3. In addition to those components described with respect to FIG. 2, system 30A of FIG. 3 includes second turbo-compressor 32A, which includes compressor 34A, motor 36A, and turbine 38A. System 30A further includes compressed air supply line 44A, controller 45A, controller 47A, compressed air supply line 48A, environmental control system 56A, compressed air supply line 58, component 60, conditioned air supply lines 62 and 62A, mixing chamber 64, recirculation line 68, recirculation fan 70, spent air supply line 72, mixing chamber 74, and supply line 76.

In system 30A turbo-compressors 32 and 32A are configured as described above with respect to FIG. 2. Compressor 34A, motor 36A, and turbine 38A are linked to each other by shaft 40A. Compressors 34 and 34A are linked to air supply line 42. Compressor 34A is also connected to compressed air supply line 44A, which is connected to fuel cell power system 46. Compressor 34A is further connected compressed air supply line 48A, which connects to controller 45A and environmental control system 56A. Compressor 34A is further connected to air supply line 58, which connects to component 60. Motor 36A is connected to fuel cell power system 46 by cable 52. Motor 36A is also connected to controller 47A. Conditioned air supply lines 62 and 62A connect environmental control systems 56 and 56A to mixing chamber 64, where conditioned air mixes. Mixing chamber 64 is connected to aircraft cabin 57 but not flight deck 59. Recirculation line 68 includes recirculation fan 70 and connects cabin 57 back to conditioned air mixing chamber 64. Spent air supply line 72 connects cabin 57 to mixing chamber 74, where fuel cell exhaust and spent air mix. Mixing chamber 74 is also connected to exhaust line 54. Turbines 38 and 38A are joined to mixing chamber 74 by supply line 76.

In operation, compressor 34 receives air such as ram air from air supply line 42 as described above. Regarding compressor 34A, air is received and compressed as described above regarding compressor 34. A first portion of compressed air generated by compressor 34A flows through compressed air supply line 44A into fuel cell power system 46. A second portion of compressed air flows through compressed air supply line 48A as metered by controller 45A into environmental control system 56A. Environmental control system 56A can be used in conjunction with environmental control system 56 on a larger aircraft or can be a back-up system in the event that environmental control system 56 fails. Compressed air generated by compressor 34A can be divided further into a third portion, by controller 45A, which is supplied by compressed air supply line 58 to component 60. Component 60 can be any component or system of an aircraft that uses compressed air. For example, component 60 can be a fuel tank inerting system, or an anti-icing system, or a de-icing system.

As described above, environmental control system 56 functions to cool and dehumidify compressed air prior to entry into aircraft cabin 57 and flight deck 59. Environmental control system 56A functions in the same manner. Conditioned air exiting environmental control systems 56 and 56A is routed flight deck 59 and to mixing chamber 64 through air supply lines 62 and 62A. After the respective supplies of conditioned air mix, the mixed conditioned air is supplied to aircraft cabin 57 where it is circulated and then exits cabin 57 as part of a spent air supply. Mixing chamber 64 is optional. In alternate embodiments of system 30A, conditioned air supply lines 62 and 62A can be individually linked directly to flight deck 59 and directly to aircraft cabin 57, or mixing chamber 64 can be replaced with a multi-way valve. Spent cabin air can enter recirculation line 68 and can be returned to mixing chamber 64 by recirculation fan 70 where it mixes with conditioned air. Spent cabin air can also be supplied to mixing chamber 74 by air supply line 72.

Fuel cell power system 46 produces electrical power and exhaust as described above. In system 30A as depicted in FIG. 3, exhaust from fuel cell power system 46 and spent cabin air are mixed in mixing chamber 74. The combined flow of spent cabin air and fuel cell power system exhaust is supplied to turbines 38 and 38A by supply line 76 and expanded through turbines 38 and 38A to drive compressors 34 and 34A.

Figure 4:
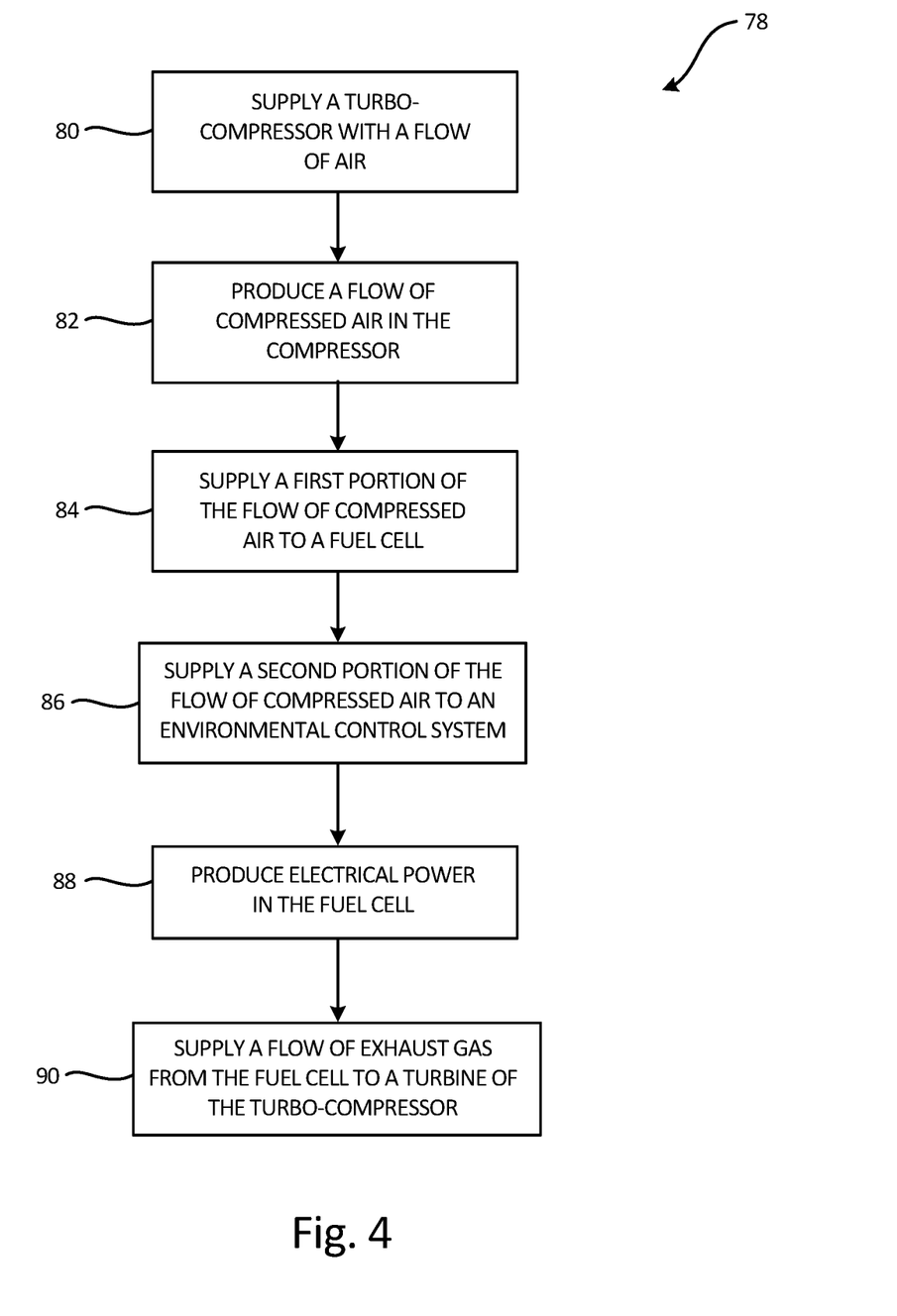
FIG. 4 is a flow diagram illustrating a method of powering system.

FIG. 4 is a flow diagram illustrating method 78 of powering a system. The method includes first supplying step 80, first production step 82, second supplying step 84, third supplying step 86, second production step 88, and fourth supplying step 90. In first supplying step 80, turbo-compressor 32 is supplied with a flow of air such as ram air. In first production step 82, a flow of compressed air is produced in compressor 34 of turbo-compressor 32. In second supplying step 84, a first portion of the flow of compressed air is supplied to fuel cell power system 46. In third supplying step 86, a second portion of the flow of compressed air is supplied to environmental control system 56. In second production step 88, electrical power is produced in fuel cell power system 46. In fourth supplying step 90, a flow of exhaust gas is supplied from fuel cell power system 46 to turbine 38 of turbo-compressor 32.

There are many reasons to use integrated fuel cell and environmental control system 30 or 30A including the following non-limiting reasons. First, because both fuel cell power system 46 and environmental control system 56 require compressed air to operate, both individual system weight and system complexity can be decreased by integrating one compressed air source for use in both systems. This is because with this design, each system does not require its own compressed air source.

Additionally, driving turbine 38 with fuel cell power system exhaust gas, or a combination of fuel cell power system exhaust gas and spent cabin air, relieves the power burden on motor 36. That is, by driving compressor 34, in whole or in part, by turbine 38 motor 36 requires less electricity from fuel cell power system 46 to drive compressor 34. In this manner fuel cell power system exhaust and/or spent cabin air find a use before being discharged from the aircraft.

Another reason to use integrated fuel cell and environmental control system 30 or 30A is that it is easy to increase redundancy or create back-ups in system 30 or 30A. For example, system 30A can include multiple turbo-compressors 32 and 32A as shown above with respect to FIG. 3. Each turbo-compressor 32 or 32A can function simultaneously or one turbo-compressor 32 can be a primary turbo-compressor 32 while the other one is a back-up turbo-compressor 32A.

Additionally, multiple fuel cell power systems 46 can be included in system 30 or 30A. This would allow a back-up fuel cell power system to function in the event of failure of fuel cell power system 46. This embodiment of system 30 or 30A could be configured in a number of different ways. For example, if system 30 includes a back-up fuel cell power system, then compressed air line 44 can be configured to selectively supply compressed air to both fuel cell power system 46 and to the back-up fuel cell power system. Access to the additional fuel cell power system can be regulated by a valve or similar element that only allows compressed air to flow towards the additional fuel cell power system in the event that fuel cell power system 46 fails. Alternatively, a separate compressed air supply line could link compressor 34 to the back-up fuel cell power system. The back-up fuel cell power system can be connected to cable 52 in order to provide power to the components of system 30. The back-up fuel cell power system can also be connected to exhaust line 54 so that the flow of fuel cell exhaust to turbine 38 of turbo-compressor 32 is maintained.

As a further example, if system 30A includes a back-up fuel cell power system, then compressed air lines 44 and 44A can be configured to supply compressed air both to fuel cell 46 and to the back-up fuel cell power system. Access to the back-up fuel cell power system can be regulated by a valve or similar element that only allows compressed air to flow towards the back-up fuel cell power system in the event that fuel cell power system 46 fails. The back-up fuel cell power system can be connected to cable 52 in order to provide power to the components of system 30A. The back-up fuel cell power system can also be connected to exhaust line 54 so that the flow of exhaust to turbines 38 and 38A of turbo-compressors 32 and 32A is maintained.

In short, increasing redundancy simply requires additional turbo-compressors 32, or fuel cell power systems 46 to be added to systems 30 and 30A. Thus, the need for current back-up systems used in aircrafts such as a ram air turbine, an auxiliary power unit, or an engine driven gearbox can be eliminated.

An additional reason to use fuel cell and environmental control system 30 or 30A is that system 30 or 30A may replace gearboxes tied to a gas turbine engine. In an aircraft, some electrical generators that are used to power aircraft systems are powered by a gearbox that runs off a gas turbine engine. Using system 30 or 30A, however, can lead to weight reduction by replacing these gearboxes. If system 30 or 30A is used instead, then the burden on the gas turbine engine will be lessened, which can result in greater fuel efficiency for gas turbine engine. Alternatively, gearboxes can still be retained on the gas turbine engines but only be used as a back-up power generation system.

A further reason to use fuel cell and environmental control system 30 or 30A is that turbo-compressors 32 or 32A can be used as primary source of compressed air in an aircraft. That is turbo-compressors 32 or 32A can be used to supply compressed air to additional aircraft systems that typically rely on bleed air from a gas turbine engine. In this manner, compressed air is largely supplied from an electrically driven source. By designing an aircraft to have a more electric architecture with a fuel cell, the efficiency of the gas turbine engines can be increased in that the gas turbine engine drives fewer non-propulsive loads.

Discussion of Possible Embodiments

The following are non-exclusive descriptions of possible embodiments of the present invention.

An integrated fuel cell and environmental control system according to an exemplary embodiment of this disclosure, among other possible things includes a turbo-compressor which includes a rotatable shaft, a compressor rotatable with the shaft to generate a flow of compressed air, a motor connected to the shaft, and a turbine connected to the shaft. A fuel cell is connected to the compressor by a first compressed air supply line that supplies a first portion of the flow of compressed air to the fuel cell. The fuel cell is connected to the turbine by a fuel cell exhaust line that supplies a flow of fuel cell exhaust to the turbine and causes the turbine to rotate. An environmental control system is connected to the compressor by a second compressed air supply line that supplies a second portion of the flow of compressed air to the environmental control system.

The integrated fuel cell and air cycle system of the preceding paragraph can optionally include, additionally and/or alternatively, any one or more of the following features, configurations and/or additional components:

A further embodiment of the foregoing integrated fuel cell and environmental control system, wherein the environmental control system can be a system including at least one of an air cycle system and a vapor cycle system.

A further embodiment of the foregoing integrated fuel cell and environmental control system, wherein the motor of the turbo-compressor can be connected to the fuel cell by a cable and can draw a load of electrical power from the fuel cell.

A further embodiment of the foregoing integrated fuel cell and environmental control system, wherein the DC bus can be connected to the fuel cell by an electrical cable.

A further embodiment of the foregoing integrated fuel cell and environmental control system, wherein the compressor can be a single stage centrifugal compressor.

A further embodiment of the foregoing integrated fuel cell and environmental control system, wherein the system can further include a source of fuel for the fuel cell.

A further embodiment of the foregoing integrated fuel cell and environmental control system, wherein the fuel can be selected from the group consisting of hydrogen, methane, methanol, carbon monoxide, or reformate including reformed hydrocarbons such as methane, methanol, ethanol, naphtha, gasoline, kerosene, and diesel.

A further embodiment of the foregoing integrated fuel cell and environmental control system, wherein the fuel cell can be a proton exchange membrane fuel cell.

A further embodiment of the foregoing integrated fuel cell and environmental control system, wherein the fuel cell can be a solid oxide fuel cell.

A further embodiment of the foregoing integrated fuel cell and environmental control system, wherein the system can further include a second turbo-compressor including a rotatable shaft, a compressor rotatable with the shaft to generate a second flow of compressed air, a motor connected to the shaft, and a turbine connected to the shaft, wherein the fuel cell is connected to the turbine by a second fuel cell exhaust line.

A further embodiment of the foregoing integrated fuel cell and environmental control system, wherein a third compressed air supply line, for transporting a portion of the second flow of compressed air can connect the compressor of the second turbo-compressor to the fuel cell.

A further embodiment of the foregoing integrated fuel cell and environmental control system, wherein the motor of the second turbo-compressor can be connected to the fuel cell by a cable and draws a load of electrical power from the fuel cell.

A further embodiment of the foregoing integrated fuel cell and environmental control system, wherein the system can further include a second environmental control system connected to the compressor of the second turbo-compressor by a fourth compressed air supply line.

A method for powering a system according to an exemplary embodiment of this disclosure, among other possible things includes the steps of supplying a compressor with a flow of air, producing a flow of compressed air in the compressor, supplying a first portion of the flow of compressed air to a fuel cell, supplying a second portion of the flow of compressed air to an environmental control system, producing electrical power in the fuel cell, and supplying a flow of exhaust gas from the fuel cell to a turbine connected to the compressor by a shaft.

The method for powering a system of the preceding paragraph can optionally include, additionally and/or alternatively, any one or more of the following features, configurations and/or additional components:

A further embodiment of the foregoing method for powering a system, wherein the flow of air can be ram air ducted from outside an aircraft fuselage.

A further embodiment of the foregoing method for powering a system, wherein the method can further include supplying a portion of the electrical power to a motor configured to drive the compressor.

A further embodiment of the foregoing method for powering a system, wherein the compressor can be selectively driven by the motor or the turbine.

A further embodiment of the foregoing method for powering a system, wherein a third portion of the flow of compressed air can be supplied to a system selected from the group consisting of a fuel tank inerting system, an anti-icing system, or a de-icing system.

A further embodiment of the foregoing method for powering a system, wherein the method can further include supplying a flow of conditioned air, generated in the environmental control system, to an aircraft cabin; and supplying circulated conditioned air from the cabin to the turbine.

A further embodiment of the foregoing method for powering a system, wherein the method can further include mixing the circulated conditioned air from the cabin and the flow of exhaust gas together before the circulated conditioned air or exhaust gas are supplied to the turbine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An integrated fuel cell and environmental control system comprising:
   a turbo-compressor comprising:
      a rotatable shaft;
      a compressor rotatable with the shaft to generate a flow of compressed air;
      a motor connected to the shaft; and
      a turbine connected to the shaft;
   a fuel cell connected to the compressor by a first compressed air supply line that supplies a first portion of the flow of compressed air to the fuel cell, wherein the fuel cell is connected to the turbine by a fuel cell exhaust line that supplies a flow of fuel cell exhaust to the turbine and causes the turbine to rotate; and
   an environmental control system connected to the compressor by a second compressed air supply line that supplies a second portion of the flow of compressed air to the environmental control system, wherein the environmental control system creates pressurized air for use in an aircraft cabin and flight deck.

2. The system of claim 1, wherein the environmental control system comprises at least one of an air cycle system and a vapor cycle system.

3. The system of claim 1, wherein the motor of the turbo-compressor is connected to the fuel cell by a cable and draws a load of electrical power from the fuel cell.

4. The system of claim 1, and further comprising:
   a DC bus connected to the fuel cell.

5. The system of claim 1, wherein the compressor is a single stage centrifugal compressor.

6. The system of claim 1, and further comprising:
   a source of fuel for the fuel cell.

7. The system of claim 6, wherein the fuel is selected from the group consisting of hydrogen, methane, methanol, carbon monoxide, or reformate including reformed hydrocarbons such as methane, methanol, ethanol, naphtha, gasoline, kerosene, and diesel.

8. The system of claim 1, wherein the fuel cell is a proton exchange membrane fuel cell.

9. The system of claim 1, wherein the fuel cell is a solid oxide fuel cell.

10. The system of claim 1, and further comprising:
    a second turbo-compressor comprising:
       a rotatable shaft;
       a compressor rotatable with the shaft to generate a second flow of compressed air;
       a motor connected to the shaft; and
       a turbine connected to the shaft;
    wherein the fuel cell is connected to the turbine by a second fuel cell exhaust line.

11. The system of claim 10, further comprising:
    a third compressed air supply line for transporting a first portion of the second flow of compressed air to the fuel cell.

12. An integrated fuel cell and environmental control system comprising:
    a first turbo-compressor comprising:
       a rotatable shaft;
       a compressor rotatable with the shaft to generate a flow of compressed air;
       a motor connected to the shaft; and
       a turbine connected to the shaft;
    a second turbo-compressor comprising:
       a rotatable shaft;
       a compressor rotatable with the shaft to generate a second flow of compressed air;
       a motor connected to the shaft; and
       a turbine connected to the shaft; wherein the motor of the second turbo-compressor is connected to the fuel cell by a cable and draws a load of electrical power from the fuel cell;
    a fuel cell connected to the compressor by a first compressed air supply line that supplies a first portion of the flow of compressed air to the fuel cell, wherein the fuel cell is connected to the first turbine by a first fuel cell exhaust line that supplies a flow of fuel cell exhaust to the first turbine and causes the first turbine to rotate, and wherein the fuel cell is connected to the second turbine by a second fuel cell exhaust line;
    an environmental control system connected to the compressor by a second compressed air supply line that supplies a second portion of the flow of compressed air to the environmental control system; and
    a third compressed air supply line for transporting a first portion of the second flow of compressed air to the fuel cell.

13. An integrated fuel cell and environmental control system comprising:
    a first turbo-compressor comprising:
       a rotatable shaft;
       a compressor rotatable with the shaft to generate a flow of compressed air;
       a motor connected to the shaft; and
       a turbine connected to the shaft;
    a second turbo-compressor comprising:
       a rotatable shaft;
       a compressor rotatable with the shaft to generate a second flow of compressed air;
       a motor connected to the shaft; and
       a turbine connected to the shaft;
    a fuel cell connected to the compressor by a first compressed air supply line that supplies a first portion of the flow of compressed air to the fuel cell, wherein the fuel cell is connected to the first turbine by a first fuel cell exhaust line that supplies a flow of fuel cell exhaust to the first turbine and causes the first turbine to rotate, and wherein the fuel cell is connected to the second turbine by a second fuel cell exhaust line;
    an environmental control system connected to the compressor by a second compressed air supply line that supplies a second portion of the flow of compressed air to the environmental control system; and a third compressed air supply line for transporting a first portion of the second flow of compressed air to the fuel cell; and a second environmental control system connected to the compressor of the second turbo-compressor by a fourth compressed air supply line.

14. A method for powering a system comprising:

supplying a compressor with a flow of air;

producing a flow of compressed air in the compressor;

supplying a first portion of the flow of compressed air to a fuel cell;

supplying a second portion of the flow of compressed air to an environmental control system;

pressurizing the second portion of the flow of compressed air in the environmental control system for use in an aircraft cabin and flight deck;

producing electrical power in the fuel cell; and supplying a flow of exhaust gas from the fuel cell to a turbine connected to the compressor by a shaft.

15. The method of claim 14, wherein the flow of air is ram air ducted from outside an aircraft fuselage.

16. The method of claim 14, and further comprising:

supplying a portion of the electrical power to a motor configured to drive the compressor.

17. The method of claim 16, wherein the compressor is selectively driven by the motor or the turbine.

18. The method of claim 14, wherein a third portion of the flow of compressed air is supplied to a system selected from the group consisting of a fuel tank inerting system, an anti-icing system, or a de-icing system.

19. The method of claim 14, and further comprising:

supplying a flow of conditioned air, generated in the environmental control system, to an aircraft cabin; and supplying circulated conditioned air from the cabin to the turbine.

20. The method of claim 19, and further comprising:

mixing the circulated conditioned air from the cabin and the flow of exhaust gas together before the circulated conditioned air or exhaust gas are supplied to the turbine.

* * * * *